No. 730,662. PATENTED JUNE 9, 1903.
A. JENSEN.
MILK HEATER OR COOLER.
APPLICATION FILED JUNE 24, 1902.
NO MODEL.
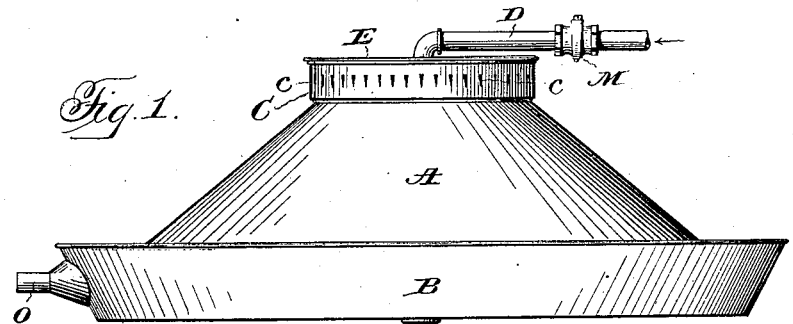
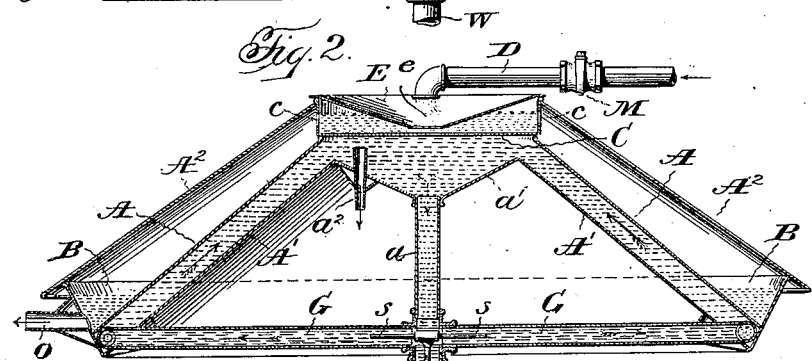
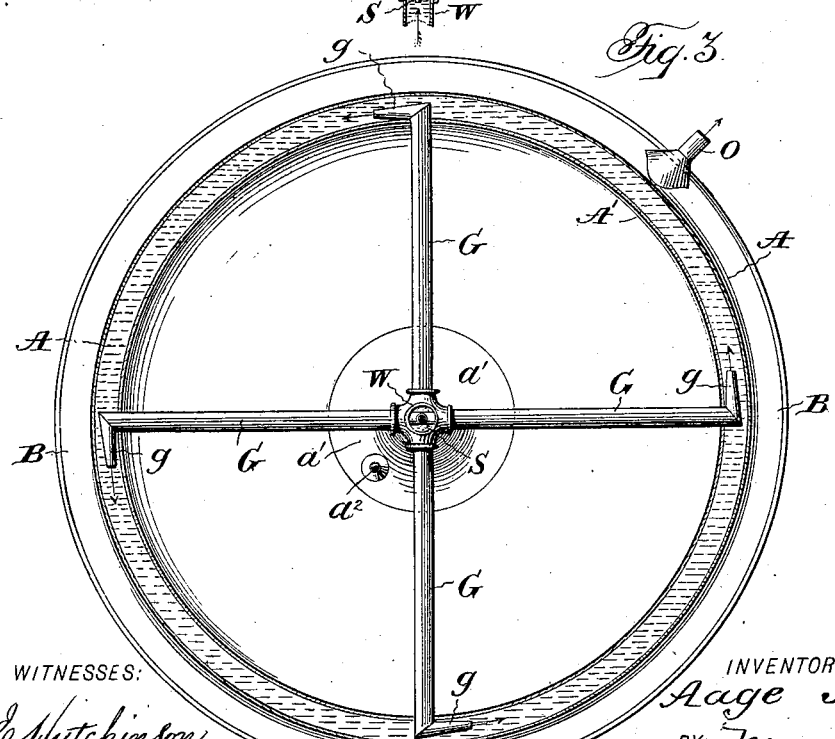
WITNESSES:
Jas. E. Hutchinson
Edw. W. Byrn.
INVENTOR
Aage Jensen.
BY Munn & Co.
ATTORNEYS.

No. 730,662.

Patented June 9, 1903.

UNITED STATES PATENT OFFICE.

AAGE JENSEN, OF TOPEKA, KANSAS.

MILK HEATER OR COOLER.

SPECIFICATION forming part of Letters Patent No. 730,662, dated June 9, 1903.

Application filed June 24, 1902. Serial No. 113,010. (No model.)

*To all whom it may concern:*

Be it known that I, AAGE JENSEN, of Topeka, in the county of Shawnee and State of Kansas, have invented a new and useful Improvement in Milk Heaters or Coolers, of which the following is a specification.

My invention is in the nature of a device for heating, cooling, and deodorizing and aerating milk and other liquids for the use of creameries, farmers, and others; and it consists in the novel construction and arrangement of the device, which I will now proceed to describe with reference to the drawings, in which—

Figure 1 is a side elevation of the device with the conical shield removed. Fig. 2 is a vertical central section, and Fig. 3 is a bottom view partly in section.

In the drawings, A represents the exterior wall and A' the interior wall of a cone-shaped vessel. At the top of the outer wall A there is mounted a pan C, having in its sides all around its periphery a series of V-shaped openings $c$. At the bottom edge of the wall A there is rigidly secured an annular trough B, extending entirely around its periphery and V-shaped in cross-section. At the upper end of the inner wall A' there is secured a funnel-shaped pan $a'$, which at the center connects with a downflow-pipe $a$. In this funnel-shaped pan there is an overflow-pipe $a^2$. At the bottom of the apparatus there is a central water-inlet pipe W, which connects with four more or less radial pipes G, (see Fig. 3,) which at their outer ends enter the annular space between the inner wall A' and outer wall A and terminate therein in right-angularly bent nozzles $g$. The pipes G also communicate at the center with the downflow-pipe $a$ from the center of the pan $a'$.

Concentrically within the water-inlet pipe W is a steam-inlet pipe S, and this steam-inlet branches into four steam-nozzles $s$ in the several branches G of the water-circulation pipes.

On the top of the pan C there rests a funnel-shaped tray E, which at the center has an opening $e$ into the subjacent pan C. This tray E receives the milk or other liquid to be heated, cooled, or aerated from a supply-pipe D, having a stop-cock M.

$A^2$ is a conical shield extending from the pan C at a point above its holes $c$ down to and over the edge of the trough B, which latter has an outlet at O.

The operation of the device is as follows: The milk or other liquid is discharged from pipe D into tray E and thence into pan C. It then issues through the circle of holes $c$ in the sides of this pan, which holes should be on the same level, and flowing through these holes onto the exterior face of the wall A is spread out in a thin film over the same, which film becomes thinner as it descends by virtue of the increasing area of the bottom part of the cone, and is finally collected in the annular trough B and discharged through the spout O. This thin film of liquid is thus exposed intimately to the air to become aerated and deodorized. The object of the V shape of the holes $c$ is to cause a uniform distribution of the liquid irrespective of the quantity coming in. When only a small quantity of milk is admitted, it runs through the smaller and lower ends of the V-shaped holes, and when a larger quantity is admitted the level rises to the larger area of the holes. The object of the funnel-shaped tray E with a hole in the center is to compel all the incoming milk to travel the same distance in reaching the V-shaped hole, and thus secure a uniform distribution and to prevent the eddying or swirling of the milk, it being obvious that if the inlet-point were closer to one side of the pan than the other some of the holes $c$ would be surcharged and others inadequately supplied, with the result that the distribution over the conical surface would not be uniform. At the same time that the milk is passing in a thin film over the conical surface of the wall A it is also heated or cooled, as may be required, by a circulating medium of hot or cold water in the annular space between the two walls A and A'. When the milk is to be heated, steam is introduced through the steam-pipe S and issuing through the nozzles $s$ sets up circulating currents in the pipes G outwardly to the nozzles $g$ and then turning causes the water heated by the steam to circulate with a swirling or vortex action in the annular space between A and A', rising gradually as it becomes heated to the pan $a'$ and then descending through the central pipe $a$ to be again acted upon by the steam, and thus kept in a continuous cycle of circulation and gradually imparting the heat of the steam to the milk flowing in a thin film over the outer surface of the conical wall A. If, on the other hand, the milk is to be cooled, then steam is not employed; but a stream of cold water is continuously introduced through the pipe W, and this water passes through the pipes G to the lower edge of the cone, where it begins to absorb the heat of the milk, and as this water becomes warmer it becomes lighter, and rising from convection it gains the pan $a'$ and rises to the level of the top of the overflow-pipe $a^2$ and passing down through the same is discharged upon the ground or into any suitable receiver. As the milk passes down over the outer surface of the conical wall A it is protected against dust, dirt, insects, and all impurities by the covering conical shield $A^2$, which extends over and covers the conical wall A. If a better aeration and deodorizing of the milk is required, this shield may be removed.

Having thus described my invention, what I claim as new, and desire to secure by Letters Patent, is—

1. A heating cooling and aerating device, comprising a conical wall arranged to be heated or cooled, and a receiving and distributing pan mounted upon the top of said conical wall, said pan having in its sides a circular series of holes in the same horizontal plane, said holes being of V shape as and for the purpose described.

2. A heating cooling and aerating device, comprising a conical wall arranged to be heated or cooled, a receiving and distributing pan mounted on the top of the same and having a circular series of holes in its side walls, and a funnel-shaped tray in the pan with a concentric opening substantially as and for the purpose described.

3. A heating cooling and aerating device, comprising a conical wall arranged to be heated or cooled, a receiving and distributing pan mounted upon the top of the same and having a series of holes in its sides, and a conical shield fitting the said pan above the holes and extending over and inclosing the conical wall over which the liquid to be cooled is flowed, substantially as described.

4. A heating cooling and aerating device, comprising a conical wall with means for distributing the liquids over its external surface, and an inner wall forming an annular conical chamber to receive a heating or cooling medium, means for causing said medium to circulate and an external conical shield substantially as described.

5. A heating cooling and aerating device, comprising a conical wall with means for distributing the liquids over its external surface, an inner wall forming an annular conical chamber to receive the heating and cooling medium, a pan at the top of the inner wall having a downflow-pipe, and an inlet-pipe with radiating branches extending to the lower edges of said annular chamber substantially as and for the purpose described.

6. A heating and aerating device, comprising a conical wall with means for distributing the liquids over its external surface, an inner wall forming an annular conical chamber and having a funnel-shaped pan at the top with a concentric downflow-pipe, concentric water and steam pipes arranged below the downflow-pipe and having radiating branches connecting with the lower part of the annular chamber substantially as and for the purpose described.

AAGE JENSEN.

Witnesses:
EVA HUTCHISON,
FRANK T. BURNHAM.